(12) United States Patent
Oshima et al.

(10) Patent No.: US 8,234,508 B2
(45) Date of Patent: Jul. 31, 2012

(54) INFORMATION PROCESSING APPARATUS, SYSTEM AND COMPUTER READABLE MEDIUM FOR THE SAME

(75) Inventors: Akihide Oshima, Saitama (JP); Yuriko Inakawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 401 days.

(21) Appl. No.: 12/538,431

(22) Filed: Aug. 10, 2009

(65) Prior Publication Data
US 2010/0218007 A1  Aug. 26, 2010

(30) Foreign Application Priority Data
Feb. 26, 2009  (JP) .................................. 2009-043332

(51) Int. Cl.
*G06F 1/00* (2006.01)
*G06F 15/00* (2006.01)
*G06F 21/00* (2006.01)

(52) U.S. Cl. .......... 713/300; 713/182; 713/185; 358/1.1

(58) Field of Classification Search .................. 713/182, 713/183, 185, 186, 300; 358/1.1; 235/382
See application file for complete search history.

(56) References Cited

U.S. PATENT DOCUMENTS
| 7,839,514 B2 * | 11/2010 | Tsuchie et al. ............... 358/1.14 |
| 2005/0264846 A1 * | 12/2005 | Tsuzuki ........................ 358/1.18 |
| 2006/0200704 A1 | 9/2006 | Takahashi et al. |
| 2008/0151289 A1 * | 6/2008 | Fukasawa ..................... 358/1.15 |
| 2010/0073703 A1 * | 3/2010 | Tamada ........................ 358/1.14 |
| 2010/0127076 A1 | 5/2010 | Hashimoto |

FOREIGN PATENT DOCUMENTS
| JP | A 2002-252733 | 9/2002 |
| JP | A 2006-218810 | 8/2006 |
| JP | A-2006-277714 | 10/2006 |
| JP | A 2007-149106 | 6/2007 |
| JP | A 2010-128090 | 6/2010 |

OTHER PUBLICATIONS

Office Action issued in corresponding Japanese Application No. 2009-043332, mailed Sep. 28, 2010 (with English-language translation).

* cited by examiner

*Primary Examiner* — Mark Connolly
(74) *Attorney, Agent, or Firm* — Oliff & Berridge, PLC

(57) ABSTRACT

The information processing apparatus includes an authentication processing management section that requests an external authentication apparatus to authenticate a user who makes a processing request to the information processing apparatus and that acquires an authentication result therefrom; an authentication history management section that manages authentication history information including the authentication result of the authentication of the user, which is acquired by the authentication processing management section; a power switching section that switches a power state of the information processing apparatus; and a power control section. The power control section controls switching of a power state by the power switching section before the authentication processing management portion acquires a latest authentication result from the external authentication apparatus by referring to authentication history information registered in an authentication history table of the user, when a processing request is received from the user in a first power state.

10 Claims, 4 Drawing Sheets

| USER ID | AUTHENTICATION RESULT | AUTHENTICATION TIME AND DATE | CONTENTS OF PROCESSING REQUEST |
|---|---|---|---|
| abc123 | AUTHENTICATION SUCCESS | 2008/9/1 22:02 | PRINT PROCESSING |
| XXXyyyZ | AUTHENTICATION SUCCESS | 2008/9/10 10:20 | PRINT PROCESSING |
| XXXyyy | AUTHENTICATION FAILURE | 2008/9/10 10:15 | STATUS CHECK |
| 9876543 | AUTHENTICATION FAILURE | 2008/5/1 14:14 | FAX PROCESSING |
| 9876543 | AUTHENTICATION SUCCESS | 2007/12/25 10:25 | STATUS CHECK |
| ⋮ | ⋮ | ⋮ | ⋮ |

…

INFORMATION PROCESSING APPARATUS, SYSTEM AND COMPUTER READABLE MEDIUM FOR THE SAME

CROSS-REFERENCE TO RELATED APPLICATIONS

This application is based on and claims priority under 35 U.S.C. §119 from Japanese Patent Application No. 2009-043332 filed on Feb. 26, 2009.

BACKGROUND

1. Technical Field

The present invention relates to an information processing apparatus, a system, and a computer readable medium for the same.

2. Related Art

One form of an information processing apparatus treating electronic information is an image processing apparatus that treats image information. For example, an apparatus which requests, when receiving from a user operating a user terminal a processing request requiring authentication of the user, an external authentication apparatus to perform authentication of a user and which performs, when the authentication apparatus succeeds in the authentication, processing requested by the user, is known as a network-enabled image processing apparatus.

SUMMARY

According to an aspect of the invention, there is provided an information processing apparatus including:

an acquisition section that requests an external authentication apparatus or an internal authentication apparatus to perform authentication of a user who makes a processing request to the information processing apparatus, and that acquires an authentication result of the authentication of the user from the external authentication apparatus or the internal authentication apparatus;

an authentication history management section that manages authentication history information including the authentication result of the authentication of the user, which is acquired by the acquisition section;

a power switching section that switches a power state of the information processing apparatus to one of a first power state, a second power state in which consumed power is more than that in the first power state, and a third power state in which consumed power is more than that in the second power state; and a power control section that controls switching of a power state by the power switching section before the acquisition section acquires an authentication result of authentication of the user from the external authentication apparatus or the internal authentication apparatus by referring to authentication history information managed by the authentication management section of the user, when a processing request from the user is received in the first power state.

BRIEF DESCRIPTION OF THE DRAWINGS

Exemplary embodiments of the present invention will be described in detail based on the following figures, wherein.

DETAILED DESCRIPTION

Hereinafter, a practical exemplary embodiment of the invention is described in detail with reference to the accompanying drawings. Incidentally, the technical scope of the invention is not limited to the following exemplary embodiments of the invention. The technical scope of the invention includes exemplary embodiments to which various modifications or improvements are applied within a range from which a specific effect obtained by the composing elements of the invention and the combinations thereof can be derived.

Figure 1:
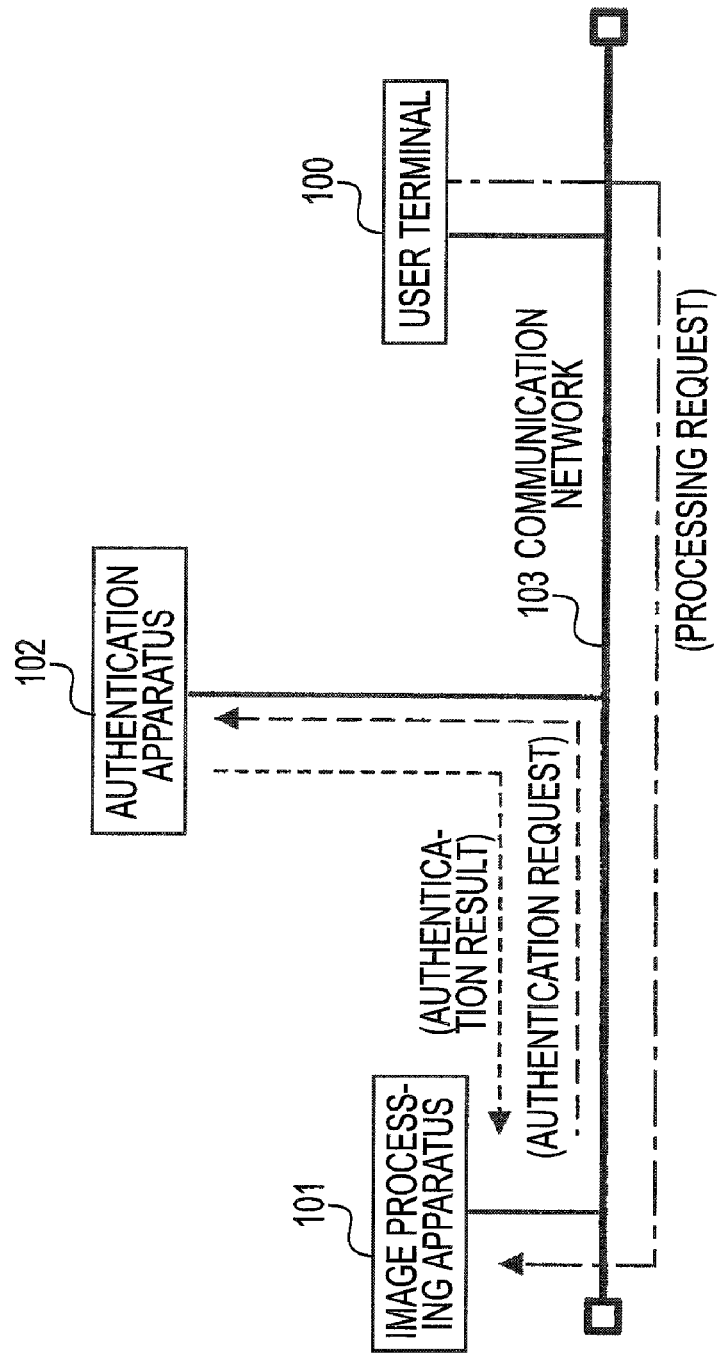
FIG. 1 is a schematic diagram illustrating the configuration of a system to which the invention is applied.

FIG. 1 is a schematic diagram illustrating the configuration of a system to which the invention is applied. The illustrated system includes a user terminal 100, an image processing apparatus 101, and an authentication apparatus 102, which are connected to one another via a common communication network 103.

The user terminal 100 is a terminal apparatus operated by a user, and is constituted by, e.g., a personal computer to which a display device (such as liquid crystal monitor) and an input device (such as a keyboard and a mouse) are attached.

The image processing apparatus 101 receives a processing request from a user who operates the user terminal, and performs processing based on the processing request (i.e., the processing requested by the user). The image processing apparatus 101 is constituted using a multifunction machine that has functions of performing a plurality of types of processing, e.g., print processing, image read processing, copy processing, and FAX (facsimile) processing.

The authentication apparatus 102 receives a request from the image processing apparatus 101 and performs the authentication of a user. The authentication apparatus 102 is constituted using, e.g., an authentication server. The authentication of a user by the authentication apparatus 102 is performed by determining whether the user to be authenticated has a qualification (or is qualified) for utilizing the image processing apparatus 101 with the intent of the processing request actually made by the user. At that time, when the user has a utilization qualification, the authentication apparatus 102 notifies the image processing apparatus 101 of (or transmits to the image processing apparatus 101) an authentication result indicating that the user is successfully authenticated. Alternatively, when the user does not have the utilization qualification, the authentication apparatus 102 notifies the image processing apparatus 101 of an authentication result indicating that the authentication of the user is failed.

The communication network 103 implements bidirectional communications among the user terminal 100, the image processing apparatus 101, and the authentication apparatus 102 based on a predetermined protocol. The communication network 103 is constituted using, e.g., a local area network (LAN).

Figure 2:
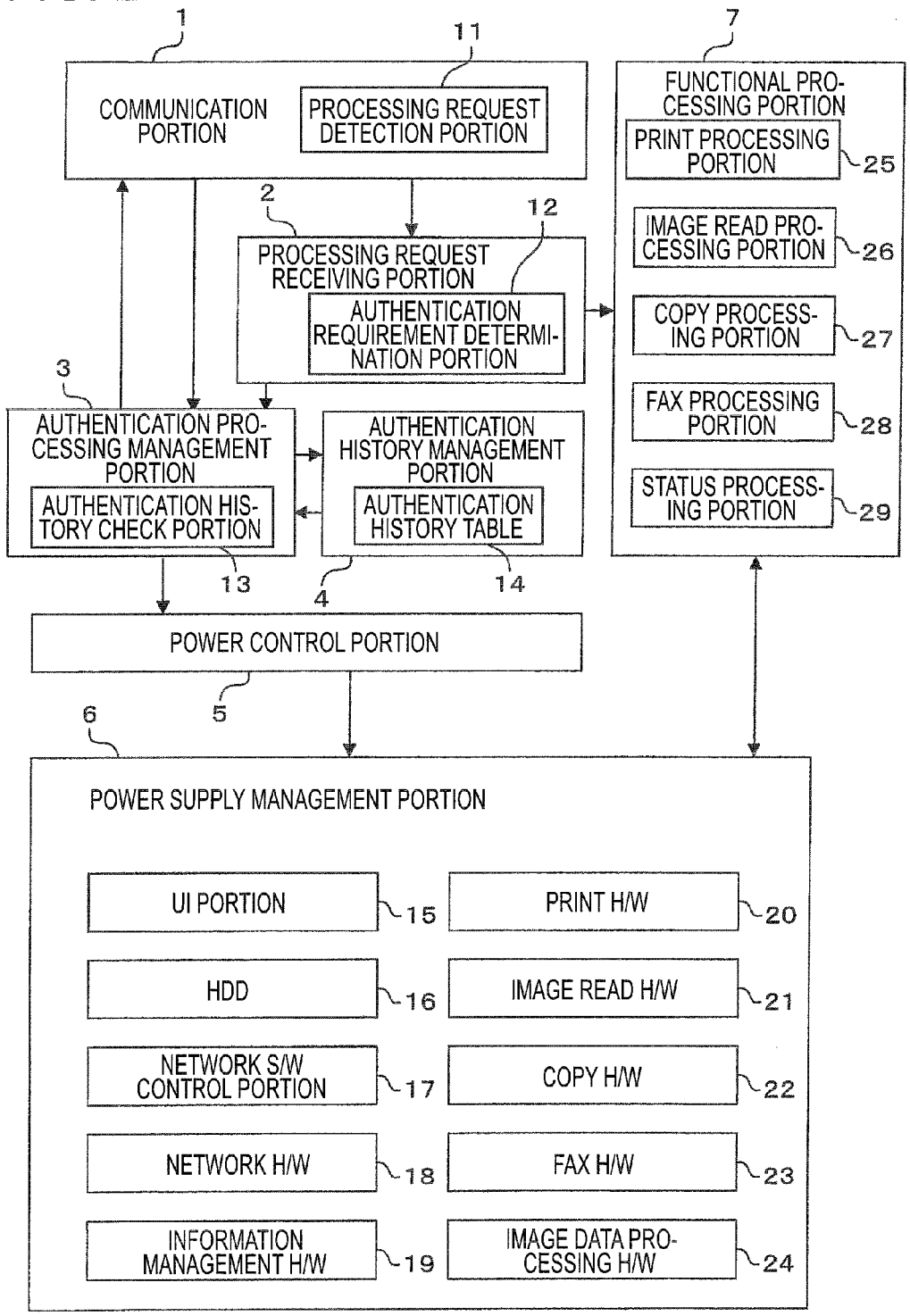
FIG. 2 is a block diagram illustrating an example of the internal configuration of an image processing apparatus according to an exemplary embodiment of the invention.

FIG. 2 is a block diagram illustrating an example of the internal configuration of the image processing apparatus 101 according to an exemplary embodiment of the invention. The image processing apparatus 101 roughly includes a communication portion 1, a processing request receiving portion 2, an authentication processing management portion 3, an authentication history management portion 4, a power control portion 5, a power supply management portion 6, and a functional processing portion 7.

The communication portion 1 serves as an external interface for communicating with an external apparatus (corresponding to the user terminal 100 and the authentication apparatus 102 in the present exemplary embodiment) via the above communication network 103. The communication portion 1 has a processing request detection portion 11. The processing request detection portion 11 detects whether there is a processing request to the own apparatus (more specifically, the image processing apparatus 101) from an external apparatus.

The processing request receiving portion 2 receives a processing request detected by the processing request detection portion 11 in the above communication portion 1. The processing request receiving portion 2 has an authentication requirement determination portion 12. The authentication requirement determination portion 12 determines whether it is necessary to authenticate a user actually making a processing request by operating an external apparatus (corresponding to the user terminal 100 in the present exemplary embodiment) serving as a request source of the processing request received by the processing request receiving portion 2.

The authentication requirement determination portion 12 determines the necessity of authentication according to, e.g., the contents of the processing request received by the processing request receiving portion 2. More specifically, a processing request table, in which the contents of processing requests required to authenticate a user are registered by a list, is preliminarily provided in the processing request receiving portion 2. When contents matched with those of the processing request actually received by the processing request receiving portion 2 are present in the processing request table, the authentication requirement determination portion 12 determines that the authentication of a user is necessary. When such contents are not present therein, the authentication requirement determination portion 12 determines that the authentication of a user is unnecessary. The determination on whether the authentication of a user is necessary can be performed, e.g., in the following manner. That is, an identification (ID) for a quest is preliminarily set in the authentication requirement determination portion 12 to restrict utilization conditions for utilizing the image processing apparatus 101. When a user logs in using this guest ID, the authentication requirement determination portion 12 determines that the authentication of this user is unnecessary. When a user logs in using another ID, the authentication requirement determination portion 12 determines that the authentication of this user is necessary.

The system can has a configuration in which, for example, when a processing request is sent from the user terminal 100 to the image processing apparatus 101, information (hereunder referred to as "authentication user information") required to authenticate a user is transmitted thereto together with the processing request. Alternatively, the system can have another configuration in which, for example, when the authentication requirement determination portion 12 determines that the authentication of a user is necessary, a request for presenting authentication user information is sent from the image processing apparatus 101 to the user terminal 100, and in which the user terminal 100 sends the authentication user information to the image processing apparatus 101 in response to this request. According to the present exemplary embodiment, the system is assumed to have the former configuration by way of example. Any information (hereunder referred to as "user ID") uniquely specifying a user, such as intrinsic information assigned to each user, can be used as the authentication user information. A unit of users, which is a subject of authentication, can be either an individual or an organization (group) such as a user-belonging organization or a user-assigned organization. Alternatively, information representing a combination of a user ID and a password, or information representing a user ID and a certificate can be used as the authentication user information.

The authentication processing management portion 3 manages the authentication of each user. The authentication processing management portion 3 performs a process of requesting the authentication apparatus 102 to conduct the authentication of a user, which is determined by the authentication requirement determination portion 12 to be necessary, a process of acquiring an authentication result sent (notified) back from the authentication apparatus 102 in response to the request for the authentication of the user, and a process of transferring the acquired authentication result to the authentication history management portion 4. The authentication processing management portion 3 has an authentication history check portion 13. The authentication history check portion 13 checks authentication history representing an authentication result obtained by the authentication apparatus 102, which is performed on a user, whose authentication is determined by the authentication requirement determination portion 12 to be necessary, before the latest processing request received by the processing request receiving portion 2 is made (in the past).

The authentication history management portion 4 manages authentication history information including an authentication result transferred by the authentication processing management portion 3. The authentication history management portion 4 has an authentication history table 14. The authentication history table 14 is used to store and manage authentication history information. Authentication history information corresponding to each user is registered (stored) in the authentication history table 14.

Figures 3, 4:
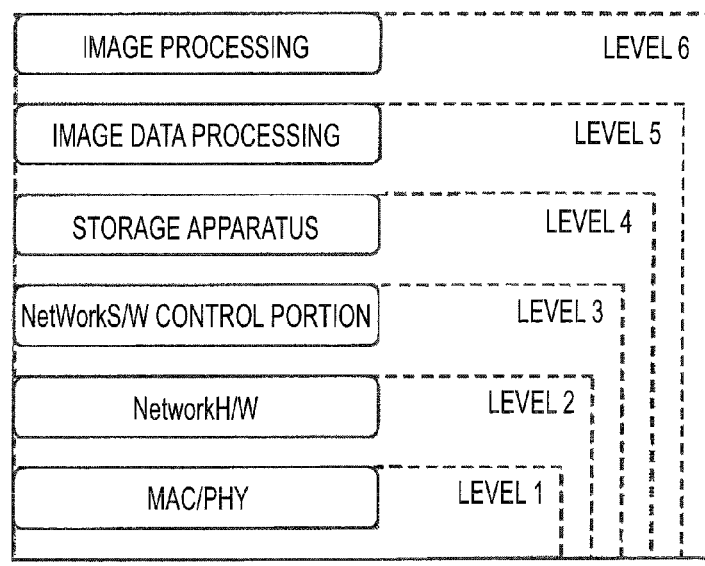
FIG. 3 is a table illustrating an example of an authentication history table.
FIG. 4 is a diagram illustrating an example of classifying a power state level.

FIG. 3 is a table illustrating an example of the authentication history table 14. Information representing an "authentication result", "authentication time and date", "contents of an authentication request" is registered in the authentication history table 14 corresponding to the "user ID" serving as the authentication user information. The information "authentication result" is information representing whether authentication is succeeded or failed. The authentication result "authentication success" or "authentication failure" is registered therein. The information "authentication time and date" is information represents a time and date on which authentication is actually performed. The information "contents of a processing request" is information representing the contents of a processing request received from a user. Referring to authentication history information of a user specified by the user ID "abc123" in the illustrated authentication history table 14, it is known that this user made a processing request corresponding to "print processing" in the past, that the authentication time and date is "2008/9/1 22:02" and that the authentication result acquired from the authentication apparatus 102 is "authentication success".

The registration of authentication history information corresponding to an unregistered user in the authentication history table 14 is performed by newly adding this authentication history information to the authentication history table 14. Authentication history information corresponding to a registered user can be either added to or overwritten onto the authentication history table 14. In the case of registering authentication history information corresponding to the registered user by being overwritten onto old authentication history information corresponding to him, only the latest (or the last) authentication history information corresponding to him is stored in the authentication history table 14. In the case of registering authentication history information corresponding to the registered user by being added to old authentication history information corresponding to him, a storage period during which authentication history information is registered in the authentication history table 14 is preliminarily determined as the past one week, the past one month, the past three months, the past half year, or the like. Authentication history information whose storage period has expired can be automatically deleted from the authentication history table 14. All processes, such as registration (including addition and overwriting), deletion, and search, of authentication history information on the authentication history table 14 are performed by the authentication history management portion 4.

The power control portion 5 controls the switching of the power state by the power supply management portion 6. When the power state is switched, the power control portion 5 issues a power state change instruction to the power supply management portion 6. The power supply management 6 switches the power state of the own apparatus according to the change instruction. The contents of a practical power control process by the power control portion 5 are described below.

The power supply management portion 6 manages the power supply of various types of hardware provided in the image processing apparatus 101. The hardware serving as subjects of the power supply management is, e.g., a user interface (UI) portion 15, a hard disk drive (HDD) 16, a network software control portion (in the drawing, "S/W" is an abbreviation of software) 17, network hardware (in the drawing, "H/W" is an abbreviation of hardware) 18, information management hardware 19, print hardware 20, image read hardware 21, copy hardware 22, FAX hardware 23, and image data processing hardware 24. The information management hardware 19 is used, e.g., in the case of storing information (status information) representing the state of a machine just before the change of the state of the image processing apparatus 101 from an operating state to a power saving state.

The power supply management portion 6 manages the power supply of the hardware by classifying the power state into six levels, as illustrated in, e.g., FIG. 4. Among the six levels, the level 1 corresponds to a power state (idle state), in which the power consumption of the own apparatus is minimized. The level 6 corresponds to a power state in which the power consumption of the own apparatus is maximized. The levels 1 to 6 are set such that the amounts of the power consumption of the own apparatus respectively corresponding to associated power states differ stepwise from one another. The power state corresponding to the level 2 is higher in power consumption from that corresponding to the level 1. The power state corresponding to the level 3 is higher in power consumption from that corresponding to the level 2. The power state corresponding to the level 4 is higher in power consumption from that corresponding to the level 3. The power state corresponding to the level 5 is higher in power consumption from that corresponding to the level 4. The power state corresponding to the level 6 is higher in power consumption from that corresponding to the level 5. In the present specification, the power state of the image processing apparatus 101, in which the processing function thereof is fulfilled to the utmost extent, is defined as the operating state. Each power state (energy saving state) in which the power consumption thereof is less than that thereof in the operating state is defined as the power saving state.

Thus, all of the power states respectively corresponding to the levels 1 to 5 are power saving states. The power state corresponding to the level 6 is an operating state. The image processing apparatus 101 is returned from a power saving state to an operating state by changing the power state of the own apparatus to that corresponding to the level 6 from one of those respectively corresponding to the levels 1 to 5. The return of the power state from the power saving state to the operating state is such that the lower the level corresponding to the power saving state just before the return to the operating state is, the longer the time taken to return the power state to the operating state becomes. That is, the higher the level corresponding to the power saving state just before the return to the operating state is, the shorter the time taken to return the power state to the operating state becomes.

Subjects of the relative comparison among the amounts of the power consumption are amounts of the power consumption corresponding to the levels 1 to 6 at a stage at which the power supply is activated. However, an increase in the power consumption due to an actual operation after the power supply is activated is not assumed. For example, the power consumption of the hard disk drive is described by way of example. As compared with the power consumption of the hard disk drive at a stage at which the power supply is activated, the power consumption thereof at a stage, at which the hard disk drive is actually operated for storing data, is large in amount. In the above classification of the power state level of the own apparatus, the power consumption at a stage at which the power supply is activated is assumed as that used for comparison in amount of the power consumption among the power states. For example, when the level corresponding to the power state of the own apparatus is changed from the level 1 to the level 2, the apparatus activates the power supply of hardware corresponding to the level 2, which includes and is more in amount than all hardware corresponding to the level 1. Alternatively, when the level corresponding to the power state of the own apparatus is changed from the level 1 to the level 3, the apparatus activates the power supply of hardware corresponding to the level 3, which includes and is more in amount than all of the hardware corresponding to the level 1 and hardware corresponding to the level 2. That is, the higher the level corresponding to the power state becomes, the number (of types) of hardware, for which the power supply is activated, is increased. The power supply management portion 6 has a function of switching the power state of the apparatus to one of those respectively corresponding to the six levels. Hereinafter, it is assumed that, for example, the level 1 corresponds to a "first power state", the level 3 corresponds to a "second power state", and the level 6 corresponds to a "third power state". However, the relationship between the levels and the power states is not limited thereto. For example, as long as the power consumption of each of the first power state, the second power state, and the third power state meets the following relationship: (the power consumption in the first power state)<(that in the second power state)<(that in the third power state), the relationship therebetween can be set in another manner in which the level 2 corresponds to a "first power state", the level 4 corresponds to a "second power state", and the level 6 corresponds to a "third power state".

The power state corresponding to the level 1 is an electric power state required to activate a function of a packet filter or the like, which determines whether a packet received via the communication network 103 according to medium access control (MAC)/physical layer (PHY) specifications is sent to the own apparatus.

The power state corresponding to the level 2 is a power state required to activate functions using network hardware, e.g., address resolution protocol (ARP)/Ping processing, broadcast search, and multicast search.

The power state corresponding to the level 3 is a power state required to activate functions of turning on the power supply of a minimum number of central processing units (CPUs), such as a CPU mounted on a network interface card according to a protocol and performing a status response (in a case where no access to the hard disk drive is needed).

The power state corresponding to the level 4 is a power state required to activate functions of turning on the power supply of a minimum number of CPUs according to a protocol and performing a status response (in a case where an access to the hard disk drive is needed) and storing data.

The power state corresponding to the level 5 is a power state required to activate functions of processing image data.

The power state corresponding to the level 6 is a power state required to activate functions of performing image processing (e.g., print processing, image read processing, copy processing, or FAX processing) the processing request for which is received from a user.

The functional processing portion 7 performs various types of functional processing, such as print processing, image read processing, copy processing, and FAX processing, according to the contents of a processing request received by the processing request portion 2. The functional processing portion 7 has a print processing portion 25, an image read processing portion 26, a copy processing portion 27, a FAX processing portion 28 and a status processing portion 29. The print processing portion 25 performs a process of printing an image on paper. The image read processing portion 26 performs a process of reading an image recorded on an original. The copy processing portion 27 performs a process of copying an image read from an original onto paper. The FAX processing portion 28 performs processes of transmitting and receiving FAX data. The status processing portion 29 performs processes of checking a status (operating condition) of the own apparatus, and notifying an external apparatus (apparatus making a request for check the status) of a check result.

Among composing elements of the image processing apparatus 101, the communication portion 1, the processing request receiving portion 2, the authentication processing management portion 3, the authentication history management portion 4, the power control portion 5, the power supply management portion 6, and the functional processing portion 7 other than hardware resources the power supply of each of which is a subject of power supply management, are implemented using computer hardware resources, such as a read-only memory (ROM), a random access memory (RAM), and a CPU. The invention includes programs for causing a computer to function as means for performing the following processes.

Figure 5:
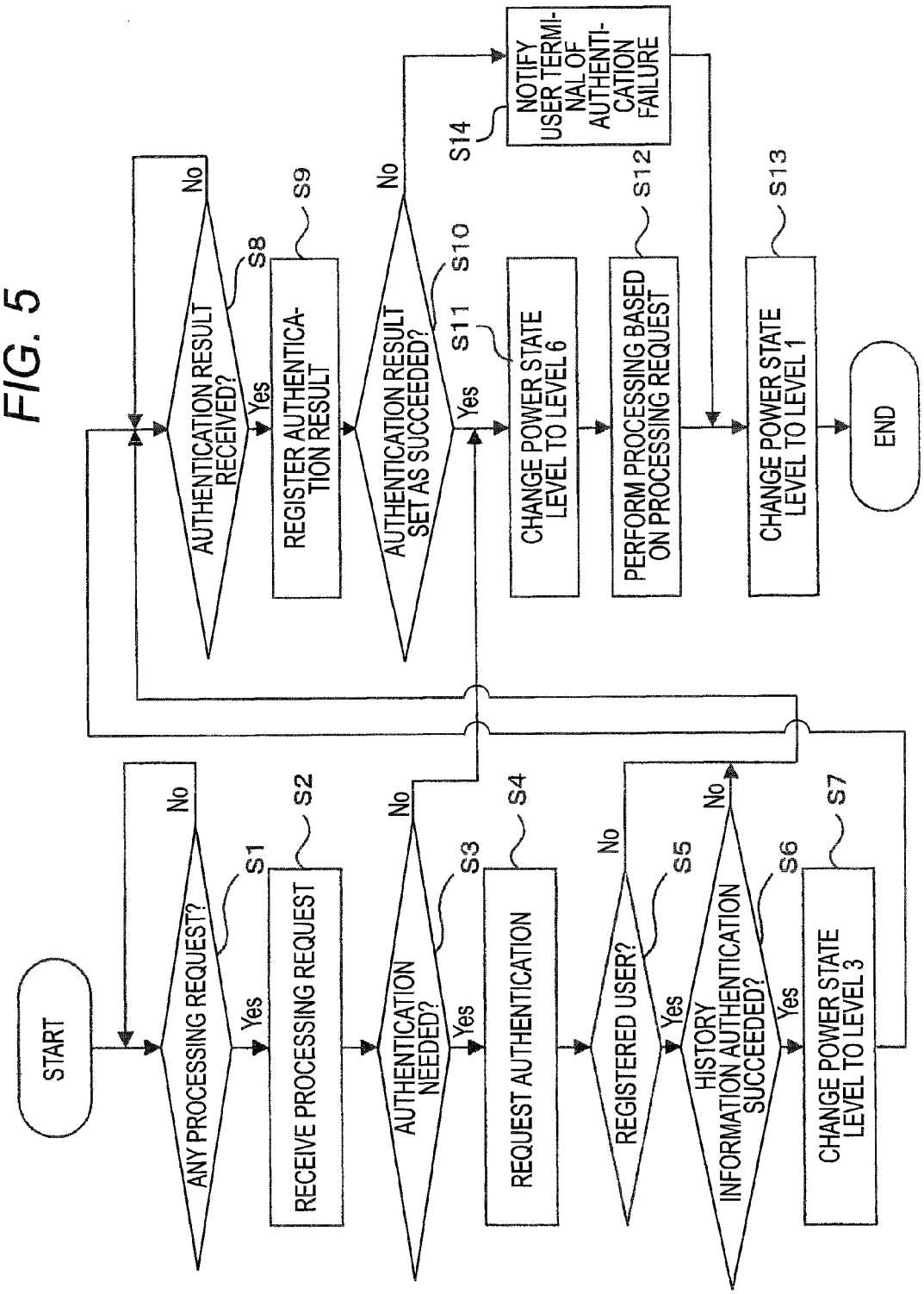
FIG. 5 is a flowchart illustrating an example of processing to be performed in the image processing apparatus according to the exemplary embodiment of the invention.

FIG. 5 is a flowchart illustrating an example of a process performed in the image processing apparatus according to the exemplary embodiment of the invention. The following processes can be performed without troubles even when the power state of the image processing apparatus 101 corresponds to the level 1.

First, in step S1, in a situation in which the level corresponds to the power state of the own apparatus is set at the level 1, the processing request detection portion 11 repeatedly checks whether there is any processing request from an external apparatus. Then, if the communication portion 1 receives a processing request sent from the user terminal 100 to the image processing apparatus 101, the processing request detection portion 11 detects the processing request to thereby determine that there is a processing request from the external apparatus (Yes in step S1).

Next, in step S2, the processing request detected by the processing request detection portion 11 is received by the processing request receiving portion 2. Then, in step S3, the authentication requirement determination portion 12 determines whether the authentication of a user making this processing request is necessary.

If the authentication requirement determination portion 12 determines that the authentication of the user is necessary (Yes in step S3), in step S4, the authentication processing management portion 3 requests the external authentication apparatus 102 via the communication portion 1 according to this determination to authenticate the user. At that time, authentication user information is transmitted together with an authentication request from the image processing apparatus 101 to the authentication apparatus 102 via the communication network 103. Then, the authentication apparatus 102 performs the authentication of the user using the authentication user information sent from the image processing apparatus 101. Upon completion of authentication of the user, which is requested by the image processing apparatus 101, the authentication apparatus 102 transmits an authentication result to the image processing apparatus 101 making the request. A certain time is taken since the image processing apparatus 101 requests the authentication apparatus 102 to authenticate the user and until the image processing apparatus 101 receives the authentication result. During that, the image processing apparatus 101 performs the following processes.

That is, in step S5, the authentication history check portion 13 checks whether authentication history information including the past authentication result corresponding to the user, whose authentication is determined by the authentication requirement determination portion 12 in step S3 to be necessary, is registered in the above authentication history table 14. The authentication history check portion 13 sends the received authentication user information (user ID in the present exemplary embodiment) together with the processing request received by the processing request receiving portion 2 in the above step S2 to the authentication history management portion 4. Then, the authentication history check portion 13 inquires of the authentication history management portion 4 whether the user specified by the authentication ser information is the user registered in the authentication history table 14. When receiving this inquiry, the authentication history management portion 4 searches the users (user IDs) registered in the authentication history table 14 for the inquired user (information representing the matched user ID). If the user ID of the inquired user is present in the authentication history table 14, the authentication history management portion 4 notifies the authentication history check portion 13 of the authentication history information concerning this user. At that time, if a plurality of pieces of authentication history information, which correspond to the inquired user and differ in the authentication time and date, are registered in the authentication history table 14, it is sufficient to notify the authentication history check portion 13 of the authentication history information corresponding to the latest authentication time and date (i.e., the authentication history information including the last authentication result) If the user ID corresponding to the inquired user is absent therein, the authentication history management portion 4 notifies the authentication history check portion 13 of this fact. When receiving such a notification, the authentication history check portion 13 determines, if the contents of the notification is the authentication history information, that the inquired user is the registered one. Then, this process proceeds to step S6. If the contents of the notification indicate that the user ID corresponding to the inquired user is absent in the authentication history table, the authentication history check portion 13 determines that the inquired user is not registered therein. Then, this process proceeds to step S8.

Next, in step S6, the authentication history check portion 13 refers to the authentication history information sent from the authentication history management portion 4 to thereby check whether the result of the authentication of the user included in the authentication history information (the past authentication result before the latest processing request is made) is "authentication success". If the result of the authentication of the user is "authentication success", the authentication history check portion 13 notifies the power control portion 5 of this fact. When receiving this notification, in step S7, the power control portion 5 instructs the power supply management portion 6 to change the level 3 corresponding to the power state of the own apparatus. Consequently, according to the instruction from the power control portion 5, the power supply management portion 6 changes the level corresponding to the power state of the own apparatus from the level 1 to the level 3. In this case, the power control portion 5 controls an operation of the power supply management portion 6 to change the level 1 to the level 3.

On the other hand, if the authentication history information corresponding to the user, the authentication of which is determined to be necessary, is not registered in the authentication history table 14 (No in step S5), or if the authentication result is "authentication failure" even when registered (No in step S6), this process proceeds to step S8 without performing processing (power state switching) in step S7. In this case, the power control portion 5 controls an operation of the power supply management portion 6 not to switch the level corresponding to the power state of the own apparatus from the level 1 to the level 3.

If the authentication history information of the user is referred to in step S6 to determine whether the result of the authentication is "authentication success", in a situation in which a plurality of pieces of authentication history information, which differ in the authentication time and date from one another, corresponding to one user ID are registered in the authentication history table 14, the authentication history check portion 13 can determine according to whether the authentication result corresponding to the latest authentication time and date is "authentication success". However, the invention is not limited to this. For example, the image processing apparatus can be modified such that the rates of the results "authentication success" and "authentication failure" included in a plurality of pieces of authentication history information registered in the authentication history table 14 are checked, and that the rate of the result "authentication success" is higher than a preset value (e.g., 80%), the authentication can be determined to be succeeded, while the authentication can be determined otherwise to be failed.

Subsequently, in step S8, the authentication processing management portion 3 checks whether the communication portion 1 receives the authentication result transmitted from the authentication apparatus 102, which requests the authentication of the user in the above step S4, to the own apparatus. If the communication portion 1 receives this authentication result, the authentication management portion 3 acquires the authentication result at this stage.

Next, in step S9, the authentication processing management portion 3 transfers the authentication result acquires from the authentication apparatus 102 to the authentication history management portion 4. When receiving the authentication result, the authentication history management portion 4 registers the authentication history information including the latest authentication result associated with the authentication user information (user ID) in the authentication history table 14.

Next, in step S10, the authentication processing management portion 3 checks whether the authentication result acquired from the authentication apparatus 102 is "authentication success". Then, if the authentication result is "authentication success", the authentication processing management portion 3 notifies the power control portion 5 of this fact. When receiving this notification, in step S11, the power control portion 5 instructs the power supply management portion 6 to change the level corresponding to the power state of the own apparatus to the level 6. Consequently, the power supply management portion 6 switches the power state of the own apparatus according to the instruction from the power control portion 5.

At that timer if the level corresponding to the power state just before the switching of the power state is the level 1, the power supply management portion 6 switches the level corresponding to the power state of the own apparatus from the level 1 to the level 6 according to the instruction from the power control portion 5. In this case, the power control portion 5 controls an operation of the power supply management portion 6 to change the level corresponding to the power state thereof from the level 1 to the level 6. If the level corresponding to the power state just before the switching of the power state is the level 3, the power supply management portion 6 switches the level corresponding to the power state of the own apparatus according to the instruction from the power control portion 5 from the level 3 to the level 6. In this case, the power control portion 5 controls an operation of the power supply management portion 6 to change the level corresponding to the power state of the own apparatus from the level 3 to the level 6.

The case where the level corresponding to the power state just prior to the switching of the level in the above step S11 is the level 1 corresponds to the case where the processing (the switching of the level corresponding to the power state) in the above step S7 is not performed. On the other hand, the case where the level corresponding to the power state just prior to the switching of the level is the level 3 corresponds to the case where the processing in the above step S7 is performed.

Next, in step S12, the functional processing portion 7 performs various types of processing (print processing, image read processing, copy processing, FAX processing, and status processing) according to the contents of the processing request received by the processing request receiving portion 2 in the above step S2.

Subsequently, in step S13, the power control portion 5 instructs the power supply management portion 6 at a stage, at which preset energy saving conditions are satisfied, to change the level corresponding to the power state of the own apparatus to the level 1. Consequently, the power supply management portion 6 switches the level corresponding to the power state according to the instruction from the power control portion 5. For example, a condition "a time during which no processing request is made by a user is equal to or longer than a predetermined time" can be applied thereto as the energy saving condition.

At that time, when the level corresponding to the power state just prior to the switching of the level is the level 6, the power management portion 6 changes the level corresponding to the power state of the own apparatus according to the instruction from the power control portion 5 from the level 6 to the level 1. In this case, the power control portion 5 controls an operation of the power supply management portion 6 to change the level corresponding to the power state of the own apparatus from the level 6 to the level 1. In a case where the level corresponding to the power state of the own apparatus just prior to the switching of the level is the level 3, the power supply management portion 6 changes the level corresponding to the power state of the own apparatus according to the instruction from the power control portion 5 from the level 3 to the level 1. In this case, the power control portion 5 controls an operation of the power supply management portion 6 to change the level corresponding to the power supply of the own apparatus from the level 3 to the level 1. In a case where the level corresponding to the power state just prior to the switching of the level is the level 1, the power supply management portion 6 maintains the level corresponding to the power state of the own apparatus at the level 1 according to the instruction from the power control portion 5. In this case, the power control portion 5 controls an operation of the power supply management portion 6 such that the level corresponding to the power state of the own apparatus is maintained at the level 1.

In the above step S13, when the level corresponding to the power state of the own apparatus is changed, the case where the level corresponding to the power state just prior to the switching of the level is the level 6 corresponds to the case where the processing in the above step S11 (switching process of the power state) is performed. The case where the level corresponding to the power state just prior to the switching of the level is the level 3 corresponds to the case where the processing in the above step S11 is not performed after the processing in the above step S7 is performed. Further, the case where the level corresponding to the power state just prior to the switching of the level is the level 1 corresponds to the case where both of the processing in the above step S7 and the step S11 are not performed.

On the other hand, when the result of the latest authentication is "authentication failure" in the above step S10, in step S14, the authentication processing management portion 3 notifies the user terminal 100 via the communication portion 1 of the authentication failure. Subsequently, the process proceeds to the processing in step S13.

In the above exemplary embodiment, the image processing apparatus 101 is configured to request the external authentication apparatus 102 to perform the authentication of the user. However, the request from the image processing apparatus 101 for the authentication of the user is not limited thereto. The image processing apparatus 101 can be modified such that an internal authentication apparatus having an authentication function is incorporated into the image processing apparatus 101, and that the image processing apparatus 101 requests the internal authentication apparatus to perform the authentication of a user. The "external authentication apparatus" is defined as an authentication apparatus connected to the image processing apparatus 101 via the communication network 103. The "internal authentication apparatus" is defined as an authentication apparatus incorporated in the main unit of the image processing apparatus 101 or as an authentication apparatus connected to the image processing apparatus 101 through a communication cable in a one-to-one correspondence manner without through the communication network 103. In the case of incorporating the "internal authentication apparatus" into the image processing apparatus 101, it is advisable to activate the power supply of hardware needed for performing authentication at the level 1. The external authentication apparatus 102 is unnecessary for the configuration of the system for performing the authentication of a user using the "internal authentication apparatus".

In the above exemplary embodiment, if the result of the authentication, which is registered in the authentication history table 14 and corresponds to the user whose authentication determined to be necessary, is "authentication success", the level corresponding to the power state of the own apparatus is set to be changed from the level 1 to the level 3. A level, to which the level corresponding to the power state is switched, can be set according to the contents of the processing request included in the authentication history information to be other than the level. For example, in a case where the content of the processing request included in the authentication history information represents print processing, image read processing, or copy processing, the level 1 can be changed to the level 5. In a case where the content of the processing request included in the authentication history information represents FAX processing, the level 1 can be changed to the level 4. In a case where the content of the processing request included in the authentication history information represents status check processing, the level 1 can be changed to the level 3. In a case where the content of the processing request included in the authentication history information represents print processing, and where the level corresponding to the power state of the own apparatus can be changed from the level 1 to the level 5, the processing of image data sent from the user terminal 100 for printing can be precedingly started after the level corresponding to the power state is changed and before the authentication result is received (acquired) from the authentication apparatus 102. In a case where the power state of the own apparatus is changed from the first power state to the second power state when the past authentication result (the last authentication result in the present exemplary embodiment) represented by the authentication history information is "authentication success", processing based on the processing request from the user can be performed to a halfway stage by maintaining the second power state after changed from the first power state and until the latest authentication result is acquired from the authentication apparatus 102.

In addition, in the foregoing description of the above exemplary embodiment, the image processing apparatus 101 has been described as an example of the information processing apparatus according to the invention. However, the information processing apparatus according to the invention is not limited thereto. The invention can be widely applied to general information processing apparatuses where processing is performed by receiving a processing request from the user who operates the user terminal 100. However, among image processing apparatuses, image forming apparatuses such as a printer, a copier, a FAX machine, or a multifunction machine having the functions of them, more specifically, an electrophotographic image forming apparatus has a source of heat. Thus, there are tendencies that the power consumption of the electrophotographic image forming apparatus in an idle state is large, and that on the other hand, a time taken by the electrophotographic image forming apparatus to return to an operating state from a power saving state is long. Accordingly, when the invention is applied to an image forming apparatus, more specifically, an electrophotographic image forming apparatus, the invention has a large effect on reduction in the time required to start performing processing.

What is claimed is:

1. An information processing apparatus comprising:
   an acquisition section that requests an external authentication apparatus or an internal authentication apparatus to perform authentication of a user who makes a processing request to the information processing apparatus, and that acquires an authentication result of the authentication of the user from the external authentication apparatus or the internal authentication apparatus;

an authentication history management section that manages authentication history information including the authentication result of the authentication of the user, which is acquired by the acquisition section;
a power switching section that switches a power state of the information processing apparatus to one of a first power state, a second power state in which consumed power is more than consumed power in the first power state, and a third power state in which consumed power is more than consumed power in the second power state; and
a power control section that controls switching of a power state by the power switching section before the acquisition section acquires an authentication result of authentication of the user from the external authentication apparatus or the internal authentication apparatus by referring to authentication history information managed by the authentication management section of the user, when a processing request from the user is received in the first power state.

2. The information processing apparatus according to claim 1, wherein
when a result of authentication of a user, which is included in the authentication history information, is authentication success, the power control section controls the power state of the information processing apparatus to be switched from the first power state to the second power state.

3. The information processing apparatus according to claim 2, wherein
when a result of authentication of a user acquired by the acquisition section is authentication success after the power state of the information processing apparatus is controlled to be switched from the first power state to the second power state, the power control section controls the power state of the information processing apparatus to be switched from the second power state to the third power state.

4. The information processing apparatus according to claim 2, wherein
when a result of authentication of a user acquired by the acquisition section is authentication failure after the power state of the information processing apparatus is controlled to be switched from the first power state to the second power state, the power control section controls the power state of the information processing apparatus to be switched from the second power state to the first power state.

5. The information processing apparatus according to claim 1, wherein
when a result of authentication of a user, which is included in the authentication history information, is authentication failure, the power control section controls the power state of the information processing apparatus not to be switched from the first power state to the second power state.

6. The information processing apparatus according to claim 5, wherein
when a result of authentication of a user acquired by the acquisition section is authentication success after the power state of the information processing apparatus is controlled not to be switched from the first power state to the second power state, the power control section controls the power state of the information processing apparatus to be switched from the first power state to the third power state.

7. The information processing apparatus according to claim 5, wherein when a result of authentication of a user acquired by the acquisition section is authentication failure after the power state of the information processing apparatus is controlled not to be switched from the first power state to the second power state, the power control section controls the power state of the information processing apparatus to be maintained in the first power state.

8. A system comprising:
a user terminal that is operated by a user;
an information processing apparatus that receives a processing request from the user who operates the user terminal, and that performs processing;
an authentication apparatus that receives a request from the information processing apparatus and that performs authentication processing of the user; and
a communication network that connects the user terminal, the information processing apparatus and the authentication apparatus, wherein
the information processing apparatus comprising:
an acquisition section that requests the authentication apparatus to perform authentication of a user who makes a processing request to the information processing apparatus by operating the user terminal, and that acquires an authentication result of the authentication of the user from the authentication apparatus;
an authentication history management section that manages authentication history information including the authentication result of the authentication of the user, which is acquired by the acquisition section;
a power switching section that switches a power state of the information processing apparatus to one of a first power state, a second power state in which consumed power is more than consumed power in the first power state, and a third power state in which consumed power is more than consumed power in the second power state; and
a power control section that controls switching of a power state by the power switching section before the acquisition section acquires an authentication result of authentication of the user from the authentication apparatus by referring to the authentication history information managed by the authentication management section of the user, when a processing request is received from the user in the first power state.

9. A system comprising:
a user terminal that is operated by a user;
an information processing apparatus that receives a processing request from the user who operates the user terminal, and that performs processing; and
a communication network that connects the user terminal and the information processing apparatus, wherein
the information processing apparatus comprises:
an acquisition section that requests an internal authentication apparatus to perform authentication of a user who makes a processing request to the information processing apparatus by operating the user terminal, and that acquires an authentication result of the authentication of the user from the internal authentication apparatus;
an authentication history management section that manages authentication history information including the authentication result of the authentication of the user, which is acquired by the acquisition section;
a power switching section that switches a power state of the information processing apparatus to one of a first power state, a second power state in which consumed power is more than consumed power in the first power state, and a third power state in which consumed power is more than consumed power in the second power state; and a power control section that controls switching of a power state by the power switching section before the acquisition section acquires an authentication result of authentication of the user from the internal authentication apparatus by referring to the authentication history information managed by the authentication management section of the user, when a processing request is received from the user in the first power state.

10. A non-transitory computer readable medium storing a program causing a computer to execute a process for processing an information apparatus, the process comprising:

an acquisition step for requesting an external authentication apparatus or an internal authentication apparatus to perform authentication of a user who makes a processing request to the information processing apparatus, and for acquiring an authentication result of the authentication of the user from the external authentication apparatus or the internal authentication apparatus;

an authentication history management step for managing authentication history information including the authentication result of the authentication of the user, which is acquired by the acquisition step;

a power switching step for switching a power state of the information processing apparatus to one of a first power state, a second power state in which consumed power is more than consumed power in the first power state, and a third power state in which consumed power is more than consumed power in the second power state; and a power control step for controlling switching of a power state by the power switching step before the acquisition step acquires an authentication result of authentication of the user from the external authentication apparatus or the internal authentication apparatus by referring to authentication history information managed by the authentication management step of the user, when a processing request is received from the user in the first power state.

\* \* \* \* \*